United States Patent [19]

Poling

[11] Patent Number: 4,653,910

[45] Date of Patent: Mar. 31, 1987

[54] REMOTE INDICATOR FOR A LASER ALIGNMENT SYSTEM

[75] Inventor: Mark E. Poling, Springfield, Ohio

[73] Assignee: Spectra-Physics, San Jose, Calif.

[21] Appl. No.: 788,753

[22] Filed: Oct. 18, 1985

[51] Int. Cl.[4] ............ G01B 11/26; G01C 3/08; G01C 15/06

[52] U.S. Cl. .................... 356/152; 356/4; 33/294

[58] Field of Search ............ 356/4, 5, 152; 33/293, 33/294

[56] References Cited

U.S. PATENT DOCUMENTS

| | | | |
|---|---|---|---|
| 3,588,249 | 6/1971 | Studebaker | 356/4 |
| 3,970,391 | 7/1976 | Johnson et al. | 356/152 |
| 4,023,908 | 5/1977 | Johnson et al. | 356/4 X |
| 4,030,832 | 6/1977 | Rando et al. | 356/152 |
| 4,240,208 | 12/1980 | Pehrson | 356/152 X |
| 4,488,050 | 12/1984 | Iwafune | 33/293 X |

Primary Examiner—Stephen C. Buczinski
Assistant Examiner—Linda J. Wallace
Attorney, Agent, or Firm—Barry E. Sammons

[57] ABSTRACT

A laser alignment system includes a remote indicator to display the alignment data when the main receiver is out of sight. The remote indicator receives both operating power and alignment data through a connecting cable to the main receiver. A Liquid Crystal Display (LCD) is used in the remote indicator because of its inherently low power consumption. To make the LCD visible under conditions of reduced ambient lighting, a light source illuminates the LCD from behind. A lighting control circuit turns the light source on only when alignment data is present in order to limit battery drain on the main receiver.

5 Claims, 3 Drawing Figures

REMOTE INDICATOR FOR A LASER ALIGNMENT SYSTEM

BACKGROUND OF THE INVENTION

1. Field of the Invention

The field of the invention is laser alignment systems, and more particularly remote indicators for the main receivers of such laser alignment systems.

2. Description of the Prior Art

Laser alignment systems are well known in the industry, primarily for use at construction sites to establish a level plane. Several such systems have been described, for example in U.S. Pat. No. 3,588,249 and co-pending applications Ser. No. 788,800 and Ser. No. 788,764 by the assignee of the present invention. In a typical application, a central transmitter projects laser light in a precise, level, 360° alignment plane established at the transmitter. One or more main receivers are then used through out the construction site to detect the alignment plane of light and indicate whether the receiver is above, below, or on the alignment plane.

These systems are primarily used in heavy construction areas where obstructions such as excavations or uneven terrain sometimes make it necessary for an operator to mount the receiver on a rod or other device in order to reach the alignment plane. When this is done, the operator can no longer see the indicators on the main receiver. Some main receivers are also equipped with an audible indication of alignment, but because of the high noise levels characteristic of the construction environments in which these devices are used, the audible indication cannot always be relied upon. Some systems therefore provide a capability to attach a remote indicator to the main receiver. This remote indicator can then be mounted in view of the operator during leveling operations.

Both the main receiver and remote indicator are usually battery powered for portability. To limit the power drain on the battery, a Liquid Crystal Display (LCD) is the preferred indicating element for both units due to its greatly reduced power requirement when compared to other indicating elements, for example Light Emitting Diode (LED) displays.

While an LCD provides an advantage in power consumption, there are some problems associated with it. An LCD functions by electrically altering the reflective properties of the figures to be indicated. As such, it does not give off any luminance of its own and must be viewed under ambient light to be readable. In some cases, the remote indicator is used under conditions of reduced ambient light, for example down in an excavation, in a partially completed, unlighted building, or at night. Under those conditions, the function of the remote indicator is greatly impaired.

SUMMARY OF THE INVENTION

The present invention relates to a remote indicator for the main receiver of a laser alignment system. A cable connects the main receiver to the remote indicator providing electrical power and alignment data which indicates the relative alignment detected by the main receiver. An LCD is used in the remote indicator to provide a visual indication of the alignment data. To ensure that the LCD will be visible under conditions of reduced ambient light, a light source is located in back of the LCD to shine through it. A control circuit in the remote indicator turns the light source on whenever alignment data is being received from the main receiver. Otherwise, the control circuit turns the light source off.

A general object of the present invention is to provide a remote indicator for the main receiver of a laser alignment system with a light source in the remote indicator making it suitable for use in conditions of reduced ambient light such as is often the case when the use of a remote indicator is warranted.

A more specific object of the invention is to provide a remote indicator with a light source that is controlled so that the light source is on only when it is needed to display alignment data. The power to operate the remote indicator is drawn from a battery in the main receiver. By using the light source only when alignment data is present, the battery life is greatly extended.

A still more specific object of the invention is to include a delay element in the light source control which maintains the light source on for a few seconds after the alignment data is no longer present. Without such a delay element, the light source may flicker rapidly when the alignment data is changing, for example during initial set-up of the main receiver. The delay element provides for a stable display even under such transient conditions thereby facilitating acquisition of the alignment data.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
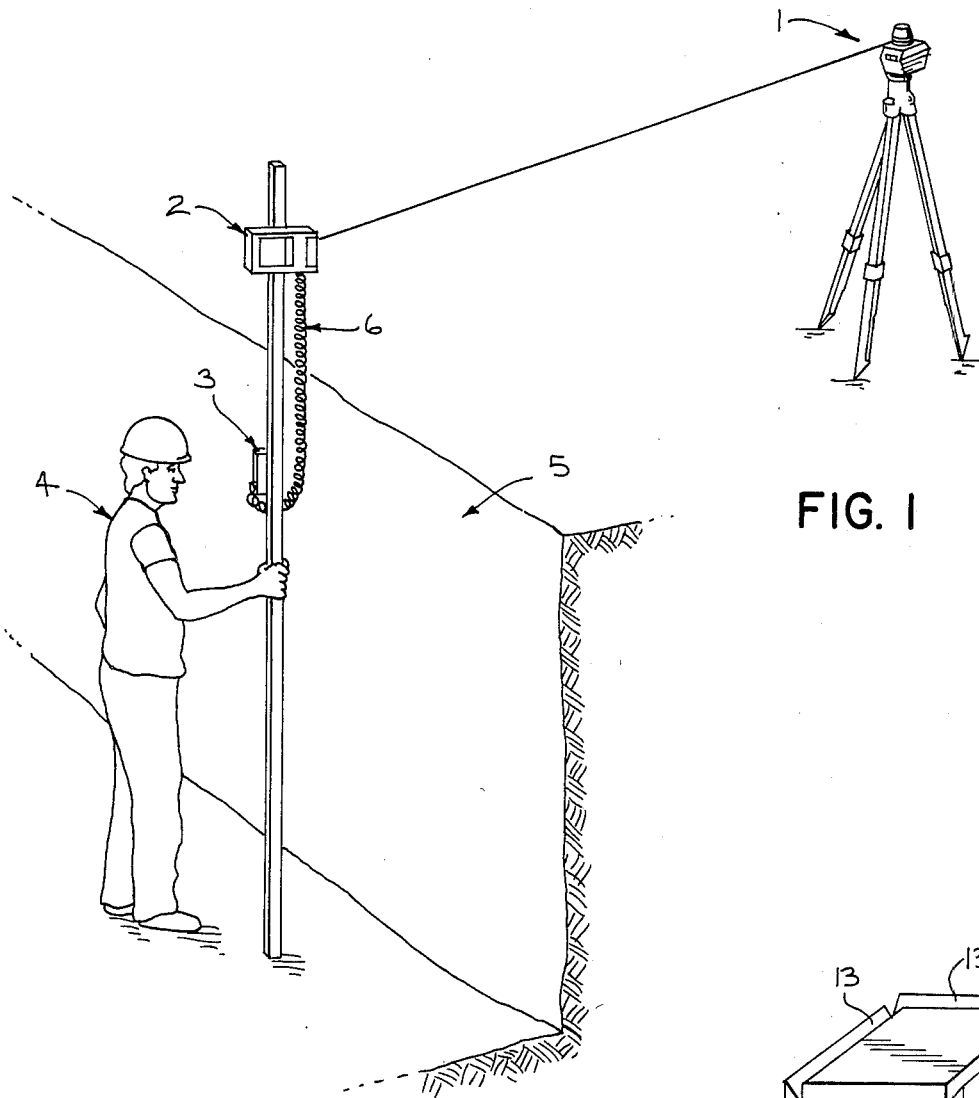
FIG. 1 is a pictorial view of a laser alignment system which employs the present invention.

Referring to FIG. 1, a laser alignment system which employs the present invention includes a transmitter 1, one or more main receivers 2, and at least one remote indicator 3. The transmitter 1 contains a laser (not shown) which produces an alignment plane by emitting coherent radiation radially outward from the transmitter 1 in all directions. The main receiver 2 is a relatively small, battery powered portable device which detects the alignment plane and contains circuitry (not shown) to determine the position of the main receiver 2 relative to the alignment plane and provide an indication of that position. The operation of the transmitter 1 and main receiver 2 of a laser alignment system is well known in the art and described in greater detail, for example in U.S. Pat. No. 3,588,249 and co-pending U.S. patent application Ser. No. 788,764 filed on even date herewith and entitled "Laser Alignment System with Modulated Field".

Still referring to FIG. 1, the main receiver 2 is at times required to be mounted out of reach of an operator 4 because of, for example uneven terrain (not shown) or an excavation 5. In that situation, a remote indicator 3 is used to display the alignment data where the operator 4 can see it. A cable 6 connects the main receiver 2 to the remote indicator 3 and carries the alignment data, as described in greater detail below.

Figure 2:
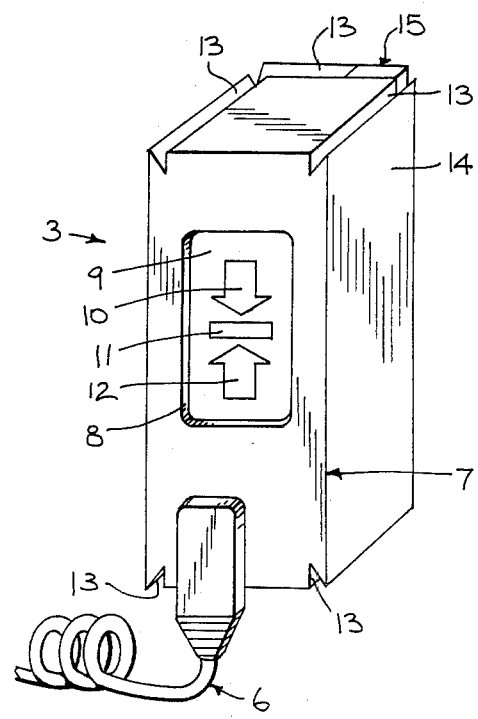
FIG. 2 is a perspective view of the remote indicator employed in the system of FIG. 1.

Referring now to FIG. 2, the remote indicator 3 includes a small rectangular housing 7 made of a molded plastic material. An opening 8 is formed in the front of the housing in which is mounted a Liquid Crystal Display (LCD) 9. The LCD 9 displays the alignment data using the shapes of a downward arrow 10, a horizontal bar 11, and an up arrow 12, to indicate that the main receiver 2 is above, on, or below the alignment plane respectively.

Referring still to FIG. 2, grooves 13 are molded into the top and bottom of each side wall 14 and back 15 of the housing 7 to accept a mounting bracket (not shown) or to permit direct attachment to the main receiver 2. The cable 6 to the main receiver 2 connects on the bottom front of the housing 7 so as not to interfere with mounting.

Because of the desirability for the remote indicator 3 to be as small as possible, operating power for the remote indicator 3 is supplied by the battery (not shown) of the main receiver 2 through the cable 6, thereby negating the need for a separate battery in the remote indicator. Using the main receiver battery (not shown) also simplifies using the system because only one battery needs to be purchased, carried, and changed. And since battery power is used, it is important to limit the power used in the remote indicator 3 to a minimum. An LCD 9 is used in preference to other types of displays due to its characteristically low power requirement. However, as is well known in the art, LCD devices must be viewed under ambient light to be readable. Some applications which require the use of the remote indicator 3 are under conditions of reduced ambient light, for example down in an excavation 5 or in a partially completed, unlighted building, or at night.

Figure 3:
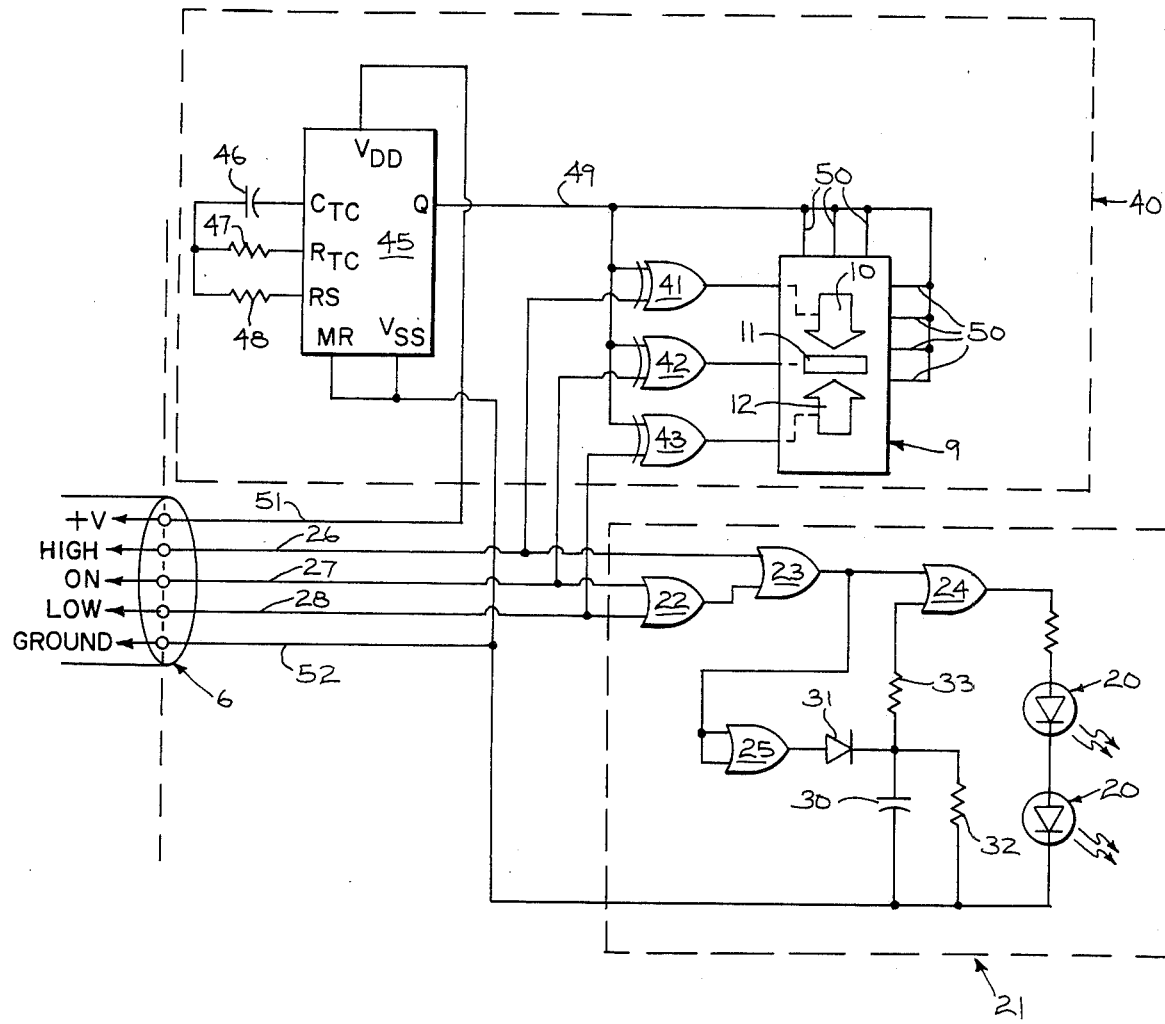
FIG. 3 is an electrical schematic diagram of the remote indicator of FIG. 2.

Referring to FIG. 3, in order to overcome the problem of operating with reduced ambient lighting, the remote indicator 3 of the present invention utilizes two Light Emitting Diodes (LEDs) 20 as light sources. The LEDs 20 are located inside the housing 7 of FIG. 2 directly behind the LCD 9 so that the light shines through the LCD 9 for maximum effectiveness. A light diffuser (not shown), as is well known in the art, is used between the LEDs 20 and the LCD 9 to spread the light evenly across the LCD 9.

Since power consumption is a primary factor as stated above, a lighting control circuit 21, shown in dashed outline, is employed to insure that the LEDs 20 are turned on only when they are needed as indicated by the presence of valid alignment data from the main receiver 2. The alignment data consists of three CMOS compatible logic signals, HIGH 26, ON 27, and LOW 28, representing the conditions of above, on, and below the alignment plane respectively. CMOS logic gates 22 and 23 are connected to perform the logical "or" of the three alignment signals, HIGH 26, ON 27, and LOW 28. The output of the "or" function at gate 23 is connected to one input of another "or" gate 24 which drives the series connected LEDs 20 through a resistor 29. The lighting control circuit 21 also includes circuitry which functions as a timer to maintain the LEDs 20 turned on for approximately one second after the alignment data is no longer present. This turn-off delay prevents flickering of the LED's 20 while the alignment data is unstable, for example during initial set up of the main receiver 2. A fourth CMOS "or" gate 25 is connected as a buffer with both inputs tied together and connected to the "or" function output at gate 23. The output of gate 25 then charges a capacitor 30 through a diode 31 to a logic "high" whenever any of the alignment signals are present. The diode 31 prevents the capacitor 30 from discharging through the gate 25 after the alignment data is no longer present so the capacitor can discharge only through a timing resistor 32. The values of the capacitor 30 and the timing resistor 32 are selected for an RC product of about 1 second. The capacitor output is connected to the other input of "or" gate 24 through a coupling resistor 33 so that the LED 20 drive will remain on until the capacitor 30 has discharged to a logic "low" value.

Still referring to FIG. 3, an LCD drive circuit indicated by dashed line 40 generates the signals necessary to drive the LCD 9. A type 4060 CMOS Oscillator 45 has a timing capacitor 46 and two timing resistors 47 and 48 connected with values selected to produce an output square wave 49 of about 135 Hz and about 50% duty cycle. The square wave is connected to the LCD common inputs 50 and to one input of each of three exclusive "or" gates 41, 42, and 43. The other input of each of the three exclusive "or" gates 41, 42, and 43 is connected to the alignment signals of HIGH 26, ON 27, and LOW 28 respectively. The square wave 49 in conjunction with the three exclusive "or" gates 41, 42, and 43 functions to generate the alternating signals needed to drive the LCD 9 in well known fashion. The operating voltage (+v) 51 and ground 52 are input to the remote indicator on the cable 6 from the main receiver 2.

The remote indicator 3 of the present invention described above is thus a compact unit that does not require a separate battery, but which can operate in darkness while keeping battery drain from the main receiver 2 at acceptable levels.

I claim:

1. A remote indicator for the main receiver of a laser alignment system the combination comprising:
    connecting means between the main receiver and the remote indicator, said connecting means being operable to supply power to the remote indicator and to transmit to the remote indicator alignment data indicative of the relative alignment detected by the main receiver;
    an LCD in the remote indicator coupled to the connecting means and operable to provide a visual indication of the alignment data;
    illuminating means located in back of the LCD operable when turned on to make the LCD visible under conditions of reduced ambient light; and
    switching means connected to said illuminating means and said connecting means and being operable to turn the illuminating means on if the alignment data is present and to turn the illuminating means off if the alignment data is not present.

2. The remote indicator as recited in claim 1 wherein the alignment data contains indications of Low, for below level, High, for above level, and On, for on level.

3. The remote indicator as recited in claim 1 wherein the switch means includes a timer operable to keep the illuminating means turned on for a pre-determined time after the alignment data is no longer present.

4. The remote indicator as recited in claim 3 wherein the timer includes a resistor, capacitor network.

5. The remote indicator as recited in claim 1 wherein the illuminating means includes a light emitting diode.

* * * * *